Aug. 7, 1956

C. F. RITCHIE 2,757,799

AUTOMATIC FILTRATION EQUIPMENT

Filed Dec. 31, 1952

INVENTOR.
Charles F. Ritchie
BY
Roland A. Anderson
Attorney

Aug. 7, 1956  C. F. RITCHIE  2,757,799
AUTOMATIC FILTRATION EQUIPMENT
Filed Dec. 31, 1952  3 Sheets-Sheet 2

INVENTOR.
Charles F. Ritchie
BY
Roland A. Anderson
Attorney

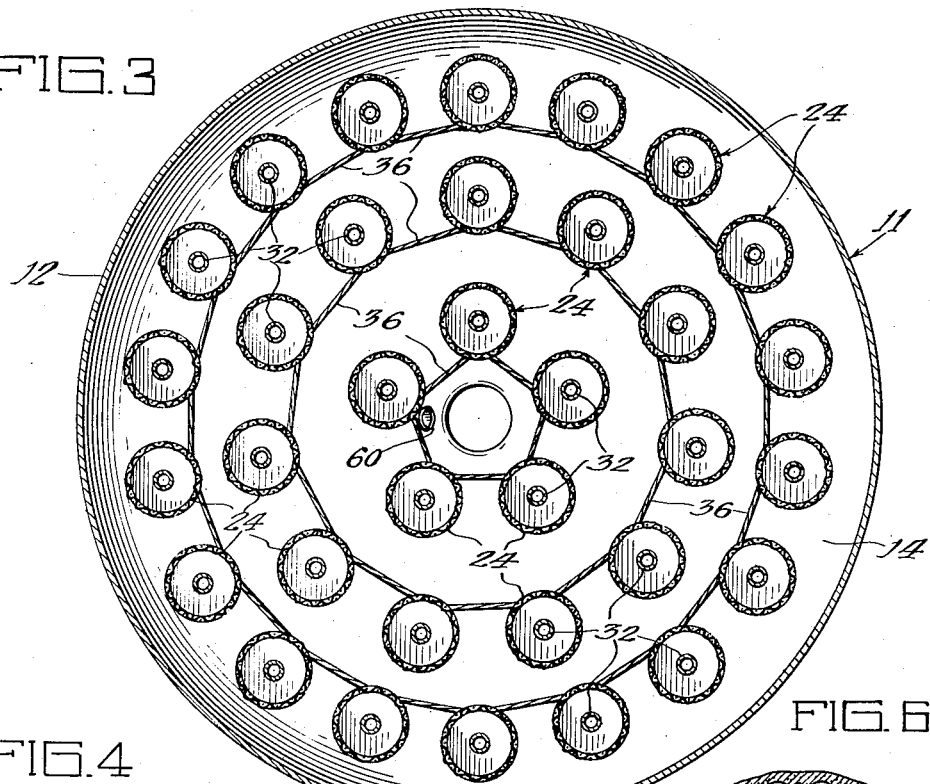
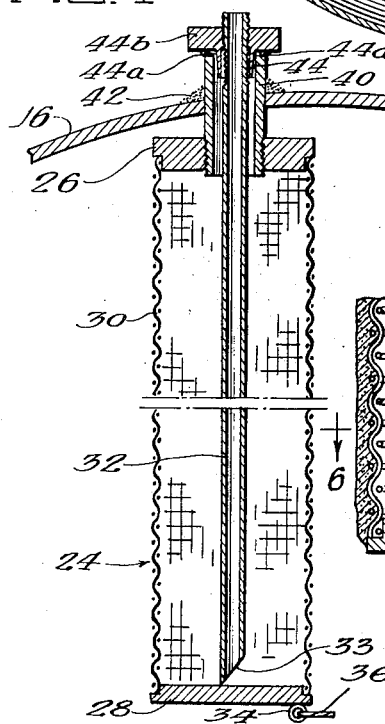
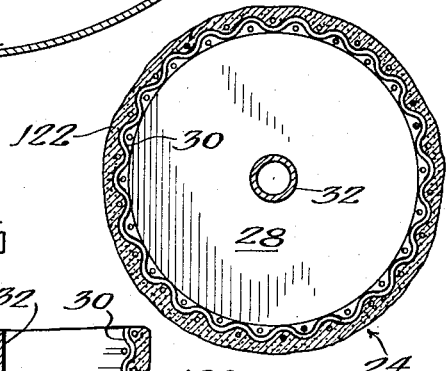

United States Patent Office 2,757,799
Patented Aug. 7, 1956

2,757,799

AUTOMATIC FILTRATION EQUIPMENT

Charles F. Ritchie, University City, Mo., assignor to the United States of America as represented by the United States Atomic Energy Commission Application December 31, 1952, Serial No. 328,919

1 Claim. (Cl. 210—150.6)

This invention relates to the filtration of liquids and more specifically to filtering apparatus of a stationary or nonrotatable type.

When corrosive fluids are to be filtered, the use of certain well known types of rotary devices becomes unpractical, for certain parts thereof which disintegrate with corrosion are very difficult to remove and replace. Thus the use of a stationary or nonrotatable type of equipment becomes desirable. Deposits of sludge accumulate in nonrotative filtering equipment, and the present invention is concerned with the rapid and efficient removal of sludge so that the filtering equipment can remain in use as much of the time as possible.

An object of the present invention is to provide an improved filtering apparatus of the nonrotative type from which deposits of sludge from filtering can be quickly removed.

A further object is to provide an improved method of filtering liquids and periodically removing accumulations of sludge resulting from filtering.

Another object is to provide an improved filtering unit forming part of the aforementioned apparatus. The filtering unit is designed so as to carry away all filtrate without undue holdup and to be easily cleaned of sludge deposits or filter cake.

Other objects will become apparent when the following specification is read together with the accompanying drawings, in which:

Fig. 3 is an enlarged horizontal sectional view taken on the line 3—3 of Fig. 2;

Fig. 4 is an enlarged fragmentary vertical sectional view showing the details of one filter unit of the filtering apparatus and the manner of mounting said unit;

Fig. 5 is an enlarged fragmentary vertical sectional view of the lower end of the filter unit particularly illustrating an end of a pipe of the unit and the deposition of sludge or filter cake on the unit;

Fig. 6 is a horizontal sectional view taken on the line 6—6 of Fig. 5; and

Figure 1:
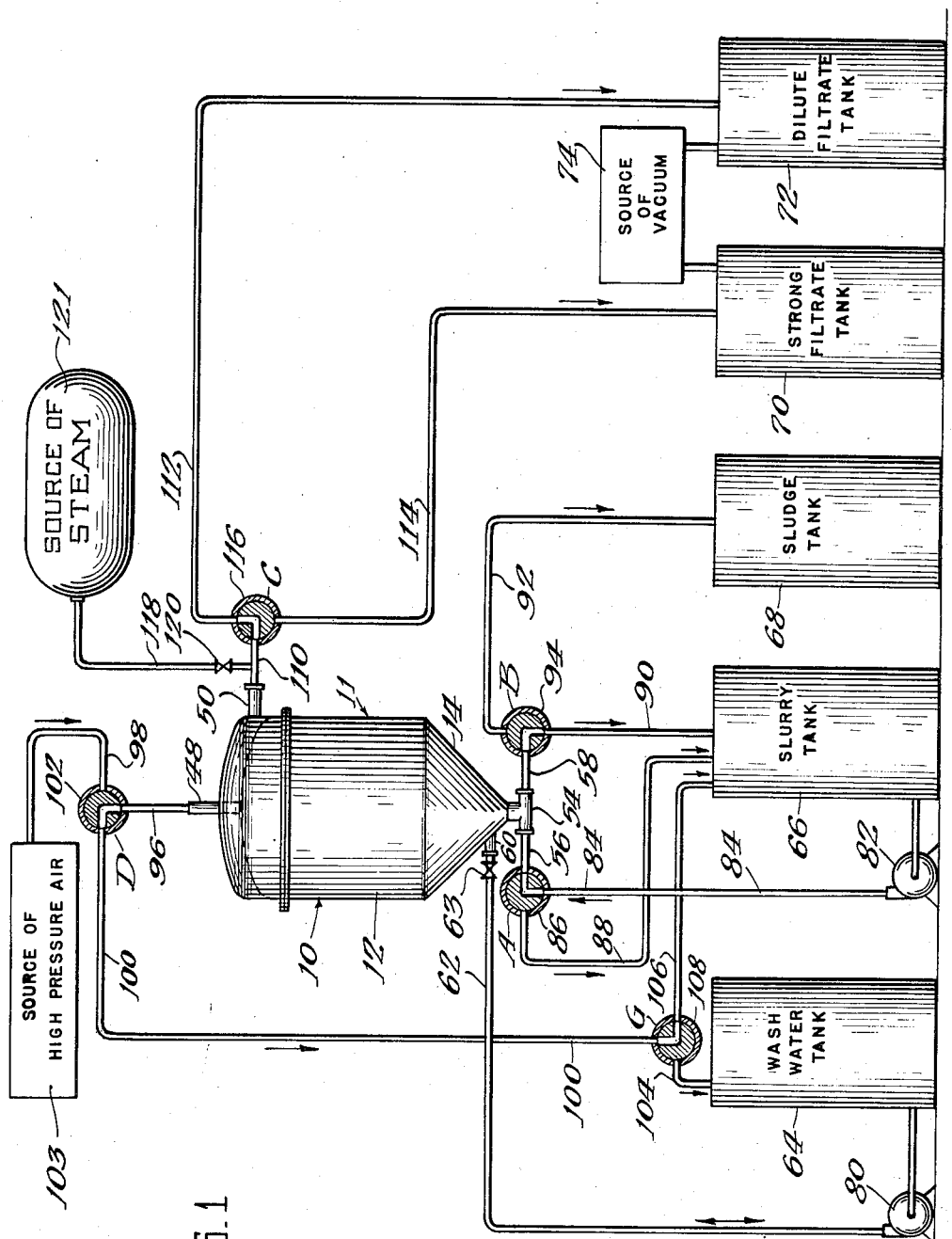
Fig. 1 is a schematic view of the novel filtering system of the present invention.
Figure 2:
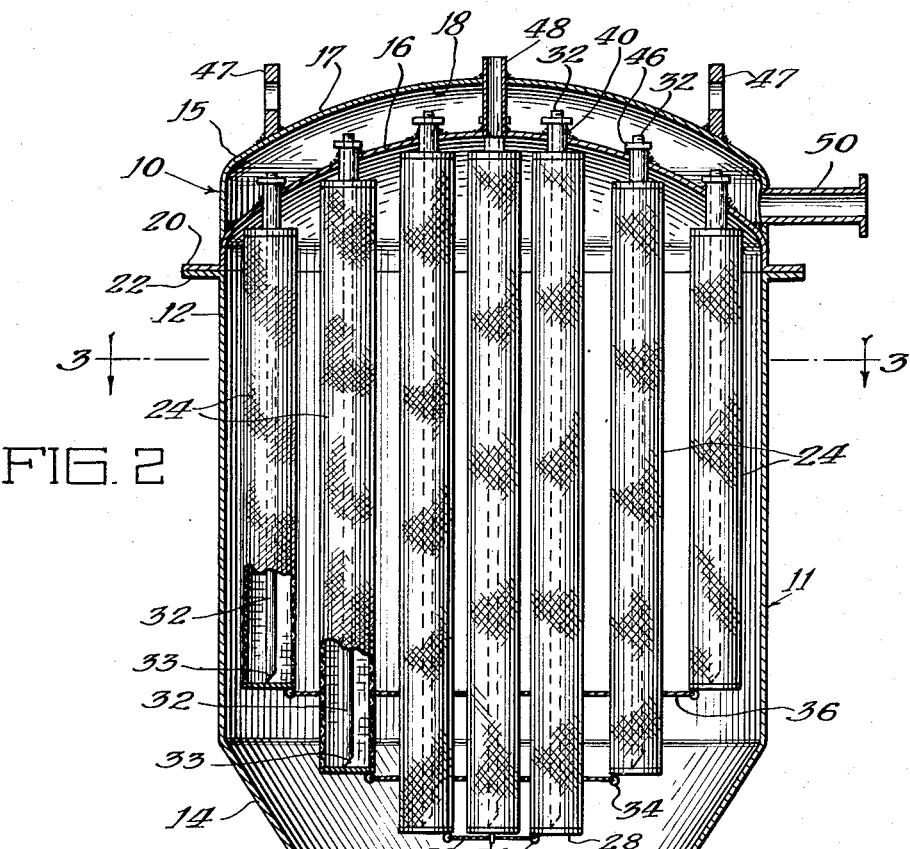
Fig. 2 is a vertical sectional view, partly in elevation, of a novel filtering apparatus that forms an important part of the above system.

As shown in Fig. 1, a filter assembly is generally indicated at 10 together with auxiliary apparatus associated therewith to be explained hereinbelow. As shown in Fig. 2, the filter assembly includes a closed housing 11 comprising a cylindrical portion 12, a cone 14 at the lower end, and a compound cover 15 including inner and outer walls 16 and 17, respectively. Between the walls 16 and 17 is a plenum chamber 18. The inner wall 16 is provided with a flange 20 by which the cover is attached to a similar flange 22 at the top of the cylindrical portion in a fluid-tight manner.

As shown in Fig. 2, a plurality of filter units 24 is suspended from the inner wall 16. The filter units are tubular and have longitudinal axes generally parallel with that of the housing 11. As shown in Fig. 3, the filter units 24 are disposed generally in a plurality of circles that lie within one another and may be concentric. In the illustrated embodiment three circles are employed. The filter units in the inner circle may be made longest and extend to lower points than do the other filter units. The filter units in the intermediate circle may be longer than those on the outer circle and extend lower than those of the outer circle. The units of the inner and intermediate units extend into the cone 14.

As shown in Fig. 4, each filter unit comprises upper and lower end members 26 and 28, a filter screen 30 in the form of a tube extending between the end members, and a central pipe 32 located within and spaced from the screen and extending from the lower end member 28 through and beyond the upper end member 26 and the inner walls 16 of the cover 15 and into the plenum chamber 18. The lower end of the pipe 32 contacts the end member 28, but is cut at an angle to the pipe axis and the end member 28, for example 45 degrees, as indicated at 33 in Figs. 4 and 5, so as to stay open and unclosed by the end member 28. It is important that the central pipe 32 go all the way to the lower end member 28 so that the pipe can take out all the filtrate within the filter screen 30. By being cut obliquely as indicated at 33, the lower end of the pipe has an opening that extends for a small distance above the lower end member 28 and is of fair size so that the pipe end will not clog.

Figure 7:
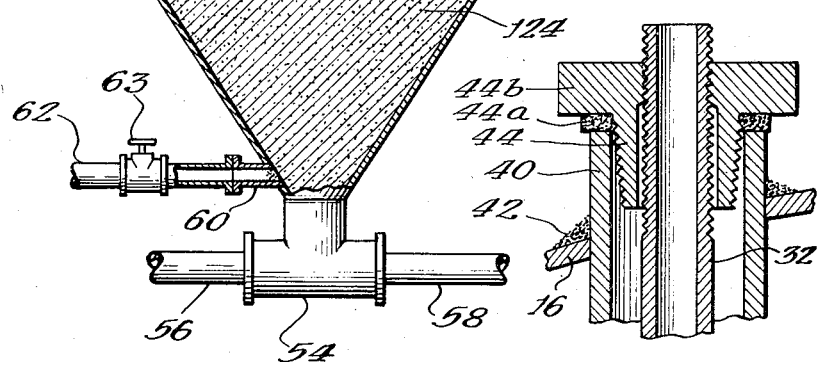
Fig. 7 is a fragmentary sectional view showing a portion of the structure of Fig. 4 but on a larger scale than Fig. 4.

As shown in Figs. 4 and 7, the upper end member 26 of each filter unit 24 is centrally apertured and threaded to receive the lower end of a sleeve 40, which extends through and is attached to the inner cover wall 16 in a suitable manner, such as by soldering or welding as indicated at 42 in Fig. 4. The upper end of the sleeve 40 lies within the plenum chamber 18 and mounts a nipple or bushing 44. The sleeve and bushing are attached to one another in a suitable soldered or welded connection 44a which is located between the very end of the sleeve 40 and flange 44b on the bushing. The upper end of the pipe 32 has a thread of appreciable length which engages a much shorter thread in the bore of the bushing 44 at the flange 44b. The remainder of the bushing bore is unthreaded and has only a loose fit with the threaded upper end of the pipe 32. The lower end of each filter unit 24 is closed by the lower end member 28. The sleeve 40, the bushing 44, and the upper end of the pipe 32 cooperate with the upper end member 26 to give the filter unit a closed upper end. Consequently, the pipe 32 provides the only path of communication between each filter unit and the plenum chamber 18.

An eye 34 is secured to the under surface of the lower end member 28 of each filter unit generally at the edge portion nearest the longitudinal axis of the filter housing 11. A wire, cable, or rod loop 36 extends through the eyes 34 of each circle or loop of filter unit 24 so as to stabilize the filter units at their lower ends and to prevent unscrewing of the upper end members 26 from the sleeves 40. The various cable loops 36 are each of a minimum total length for the sizes of the circles or loops in which the filter units are arranged, since the eyes 34 which receive the cable loops 36 are located at the regions of the lower end members nearest the vertical axis of the filter housing 11. The cable loops, being of a minimum total length, exert a maximum stabilizing effect on the filter units.

As shown in Fig. 2, eye members 47 are secured to the exterior of the outer wall 17 of the cover 15 and are adapted to be engaged by suitable lifting elements (not shown), such as hooks by which the cover may be moved away from the cylindrical section 12 of the housing 11 and the filter units 24 may be taken out of the cylindrical section 12. Attachment of all the filter units to the cover 15 has the advantage of enabling all the filter units to be removed at once. With the cover and filter units removed the cylinder 12 and cone 14 are ready for inspection and cleaning. When the filter units are to be disassembled, the cables 36 are removed, and the various upper end members 26 may be unscrewed from the sleeves 40. The associated lower end member 28 and the filter screen 30 are removed with each upper end member 26. Access is now obtained to the central pipes 32 which may be removed by being unscrewed downward from the bushings 44.

Several inlets and outlets are provided in the filter housing. A vent 48 extends between the inner and the outer walls 16 and 17 in a fluid-tight manner in order to provide communication with interior of the housing below the wall 16 and the exterior of the housing. It is pointed out that the vent 48 is disposed in the central vertical axis of the housing, there being no connection with any filter 24, as will be evident from Fig. 3. In addition a filtrate outlet 50 is provided in the cover 15 to provide communication between the plenum chamber and the exterior of the housing. A T-joint 54 is secured to an outlet formed in the apex of the cone 14. Connected to the joint 54 are pipes 56 and 58 extending from opposite sides thereof. Finally a wash inlet 60 connects with the housing at a point immediately above the joint 54, the inlet being connected to a pipe 62 via a valve 63.

The auxiliary apparatus is shown in Fig. 1 and includes a wash-water tank 64, a slurry tank 66, a precipitate or sludge tank 68, a strong-filtrate tank 70, and a dilute-filtrate tank 72. The tanks 70 and 72 are connected to a source of vacuum 74. The wash-water tank and the slurry tank are provided with pumps 80 and 82, respectively. The pump 82, which may be centrifugal, connects with the pipe 56 by means of a pipe 84. At the junction of the pipes 56 and 84 is a two-way valve 86 which may be turned to connect the pipe 84 with a return pipe 88, leading to the slurry tank. Similarly the pipe 58 leading from the T-joint 54 connects with either a pipe 90 or a pipe 92 via a two-way valve 94. The pipe 90 leads to the slurry tank and the pipe 92 leads to the sludge tank.

Above the assembly 10 the vent 48 is connected to a pipe 96 which connects with a high-pressure air line 98 and a return pipe 100 via a two-way valve 102. The line 98 is connected with a source 103 of high-pressure air. In turn the pipe 100 connects with two return pipes 104 and 106 via a two-way valve 108. The pipes 104 and 106 are return pipes to the wash and slurry tanks.

To the filtrate outlet 50 is connected a pipe 110 which connects with two pipes 112 and 114 via a two-way valve 116. The pipes 112 and 114 lead to the dilute-filtrate and strong-filtrate tanks, respectively. Between the filtrate outlet 50 and the two-way valve 116, the pipe 110 is connected to a steam pipe 118 via a valve 120. Pipe 118 is connected to source of steam 121.

Each of valves 94, 102, and 116 may occupy three positions: A first in which a given two lines or pipes are connected, a second in which one of the said two lines is connected with a third line, and a third position in which there is no passage at all through the valve between the passages and which is therefore termed a "blocking position."

Operation

The organization of the present invention contemplates the use of both pressure and vacuum. Both of these aid in conducting the filtering operation. One important function of the vacuum is that of insuring a pressure difference across the filter screens, 30, thereby preventing accidental slippage of filter cake 122 (Figs. 5 and 6). Such accidental slippage would take place during the various valve changes described below and would result in very inferior operations, especially the operation of washing.

Before filtering begins, a slurry from which a filtrate and a sludge or solids are to be obtained is circulating from the slurry tank, the pump 82, the valve 86, the line 88 and back to the slurry tank. The valve 116 is in blocking position, and the valve 94 is positioned to connect the T-joint 54 and the slurry tank. Now the valve 86 is turned to connect the pump line 84 and the line 56 leading to the T-joint 54, and the slurry now recirculates through the T-joint and the valve 94 and enters the cone 14 to some extent.

Next the valve 108 is shifted to connect the lines 100 and 106, the valve 102 is shifted to connect the lines 96 and 100, and the valve 94 is shifted to blocking position. Now the pump 82 forces the slurry into the closed housing 11. The slurry fills the housing and then begins to recycle through the vent 48, the pipe 96, the valve 102, the pipe 100, the valve 108, and the pipe 106 to the slurry tank. Up to now the valve 116 is maintained in blocking position to protect the vacuum in the filtrate tanks 70 and 72 created by the vacuum source 74. After the slurry has begun to recycle through the vent 48, the valve 116 is shifted to connect the pipes 110 and 114, preferably in response to a pressure condition in the line 96.

It has been found desirable to make the recycle line 106 of relatively small diameter or to place an orifice in such a line so as to create a considerable back-pressure within the assembly 10. The purpose of maintaining this recirculation during filtration is to prevent the sedimentation of solids in the bottom of the conical section 14. In short it is desired that all solids be either deposited upon the filter elements or carried entirely in suspension in the slurry. Centrifugal pump 82 delivers slurry to the assembly 10. At the start of the filtration, the resistance through the filter elements is low. Fluid passes through the filter elements easily, and only small amounts of liquid recirculate through line 106, despite the fact that the centrifugal pump 82 is delivering large volumes. As the filter cake 122 builds up on the filter elements less fluid passes through them. Hence the pressure delivered by the centrifugal pump must now increase, and slurry must recirculate at greater and greater rates through line 106. This provides a more or less automatic method for pressurizing the filter elements; it is desirable to start filtrations at low pressure, but to be able to apply high pressures at a later period.

Now because of the pressure on the slurry in the housing 11 and the vacuum in line 114, filtrate passes through the filter screens 30 of the filter units 24, enters the oblique lower ends of the central pipes 32 of the filter units 24, and passes through the pipes 32 into the plenum chamber 18, whence it goes through the outlet 50, the line 110, the valve 116, and the line 114 to the strong-filtrate tank.

Filtration in this manner continues until sufficient precipitate or sludge in the form of filter cake 122 (Figs. 5 and 6) has accumulated on the screens 30 to make it decreasingly efficient to continue operation. The valve 86 is then turned to connect the pipe 84 with the pipe 88 returning the slurry from the slurry pump directly to the slurry tank. At the same time the valve 94 is shifted to connect the T-joint 54 and the pipe 58 with the pipe 90, leading to the slurry tank. At the top of the assembly 10 the valve 102 is turned to connect the pipe 96 with the air line 98. Air under pressure entering the housing through the vent 48 evacuates the remaining slurry through the T-joint 54 and the valve 94 into the slurry tank. During this time filtrate continues to be sucked through the filter units 24, the plenum chamber 18, and the valve 116 into the strong-filtrate tank.

When the housing is completely evacuated leaving only the sludge or filter cake on the filters 24, the air pressure is turned off by shifting the valve 102 so as to connect the pipe 96 with the pipe 100. At the same time the valve 108 is shifted to connect the pipe 100 with the return pipe 104 leading to the wash-water tank. The valve 94 is shifted so as to close one side of the T-joint 54, the valve 86 being already shifted to close the other side of the T-joint. Wash water is then pumped from the wash-water tank 64 into the assembly 10 through the pipe 62, the valve 63 and the inlet 60. The wash water, by passing through the sludge layers 122 on the filter screens, forms a filtrate that passes through the plenum chamber 18, the valve 116, and the line 114 into the strong-filtrate tank. Overflow of wash water from the housing 11 returns to the wash-water tank by way of vent 48, line 96, valve 102, line 100, valve 108, the pipe 104. The washing continues until the density of the filtrate is reduced to a predetermined value, at which time the valve 116 is turned so as to direct the subsequent filtrate to the dilute-filtrate tank via the pipe 112. The dilute filtrate tank is likewise maintained under vacuum, both for the purpose of assisting filtration and for the purpose of maintaining the filter cake as an intact body. When only very small traces of the filtrate are in the wash filtrate in line 110, the pump 80 is stopped if it be a centrifugal pump or reversed if a positive displacement pump. At the same time the valve 102 is shifted to direct air under pressure from the air line 98 into the assembly 10 through the vent 48. After a time delay to permit the wash water to return to the storage tank, the air pressure is shut off by shifting the valve 102 to blocking position. The valve 116 is shifted to the blocking position, for the first time, breaking the vacuum on the filter elements and on the plenum chamber 18, and the valve 63 is closed.

The assembly 10 is then ready to have the sludge layer 122 dislodged from the filter screens 30 by means of a blast of steam and drop to the cone 14 as shown at 124 in Fig. 2. The valve 120 is opened rapidly, and steam passes through it, the line 110, and the outlet 50 into the plenum chamber 18 and thence through and out the pipes 32 against the filter screens 30. Since the lower ends of the pipes 32, from which the steam issues, are oblique as indicated at 33 in Figs. 4 and 5, the steam strikes the lower end members 28 of the filter units 24 at such angles as to be directed upwardly within the filter screens 30 and thus dislodges the sludge layers 122 throughout the lengths of the filter screens 30. Thus the filter screens 30 are completely freed of sludge.

The remaining operation of the process consists of driving the sludge out of the housing via the T-joint 54. For this purpose the valve 94 is shifted to connect the pipes 58 and 92. The steam valve 120 is kept open to permit the steam to drive the sludge through the T-joint and into the sludge tank 68 through the valve 94 and the pipe 92. When the sludge has been evacuated from the filter 10, the steam valve 120 is closed, and the apparatus is ready for repetition of the foregoing process.

Since certain changes can be made in the foregoing apparatus and method, it is intended that all matter shown in the accompanying drawings and described be interpreted as illustrative only and may be modified without changing the intended scope of the invention.

It is contemplated that the operation of this system may be made automatic or semi-automatic much in the same manner as a home laundry is made to operate. In fact, the organization of the pumps, tanks, valves, etc. have been chosen for easy adaptation to such automatic operation.

What is claimed is:

An assembly comprising a closed housing having openings in its top and bottom and an outlet separate from said openings, a slurry tank, a return pipe connected therewith an inlet conduit connected with the slurry tank and leading toward the bottom opening, an outlet conduit connected with the slurry tank and leading toward the top opening, a pump in the inlet conduit for passing slurry under pressure from the slurry tank through the bottom opening into the housing, out of the top opening and back to the slurry tank, a plurality of filter units positioned within the housing and connected with the housing outlet, a source of compressed air for expelling slurry from the housing, a first valve associated with the outlet conduit and the compressed-air source so as in a first position to leave the outlet conduit open and connected with the top opening of the housing and the compressed-air source disconnected from said top opening and in a second position to disconnect the outlet conduit from the top opening and to connect the compressed-air source with the top opening, a second valve associated with the inlet conduit and the slurry tank so as in a first position to connect the inlet conduit with the bottom opening of the housing and in a second position to disconnect the inlet conduit from the bottom opening and to connect the inlet conduit with the return pipe for the slurry tank, a wash-water tank, a supply conduit connecting the wash-water tank with the bottom opening of the housing, a pump in the supply conduit, a third valve associated with the outlet conduit and the wash-water tank so as in a first position to provide for flow of fluid through the outlet conduit only to the slurry tank and in a second position to provide for flow of fluid through the outlet conduit only to the wash-water tank, and a source of steam under pressure connectible with the filter units at the outlet of the housing for dislodging sludge from the filter units.

References Cited in the file of this patent

UNITED STATES PATENTS

| | | |
|---|---|---|
| 773,473 | Cassel | Oct. 25, 1904 |
| 815,021 | Kelly | Mar. 13, 1906 |
| 826,390 | Van Law | July 17, 1906 |
| 869,372 | Kelly | Oct. 29, 1907 |
| 1,107,924 | Fleetwood | Aug. 18, 1914 |
| 1,144,854 | Lass | June 29, 1915 |
| 1,412,557 | Fleetwood | Apr. 11, 1922 |
| 1,414,132 | Hurrell | Apr. 25, 1922 |
| 1,992,101 | Stuart | Feb. 10, 1942 |
| 2,272,583 | Reed | Feb. 10, 1942 |
| 2,300,849 | Tauch | Nov. 3, 1942 |
| 2,309,302 | Butler et al. | Jan. 26, 1943 |
| 2,381,462 | Naugle | Aug. 7, 1945 |
| 2,423,172 | Booth | July 1, 1947 |
| 2,523,793 | Vance | Sept. 26, 1950 |
| 2,578,636 | Smith et al. | Dec. 11, 1951 |

FOREIGN PATENTS

| | | |
|---|---|---|
| 3,973 | Austria | Apr. 25, 1901 |
| 656,533 | France | May 8, 1929 |